Oct. 24, 1933.  S. T. COLMAN  1,931,602
MEANS FOR FACILITATING THE GROWTH OF TREES AND SHRUBS
Filed Sept. 8, 1931
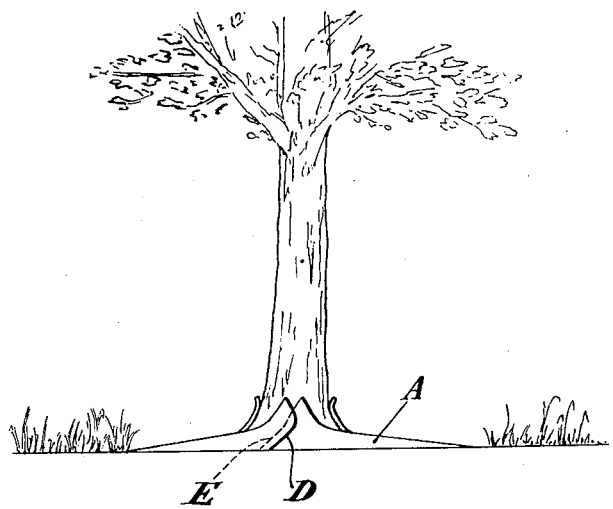
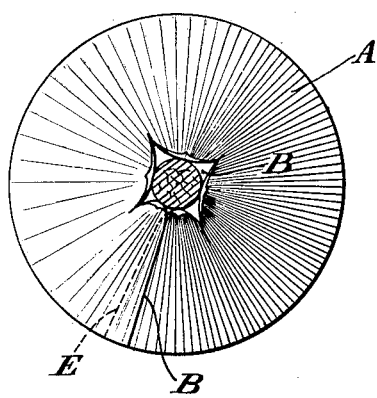
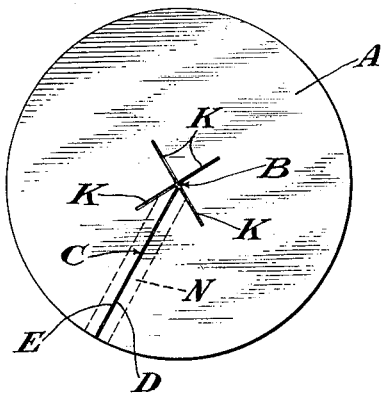

Patented Oct. 24, 1933

1,931,602

UNITED STATES PATENT OFFICE 1,931,602

MEANS FOR FACILITATING THE GROWTH OF TREES AND SHRUBS

Shirley T. Colman, Dunkirk, N. Y., assignor of one-half to The Philip Carey Manufacturing Company, a corporation of Ohio Application September 8, 1931. Serial No. 561,586

1 Claim. (Cl. 47—25)

My invention relates to a method and means for encouraging and facilitating the growth of shrubs, trees and similar vegetation where it is desired to retain moisture in the ground surrounding the shrub or tree and prevent the growth of undesirable vegetation such as weeds, grass, etc. in an area adjacent to the shrub or tree.

My invention also permits mowing lawn or cutting any standing grass or weeds near tree, shrub, etc. with lawnmower or scythe. Also it permits cultivation close to edge of collar about tree.

The invention is designed to provide an individual method and individual means for facilitating the growth of trees or shrubs by providing a relatively permanent mulching collar which is placed about the trunk of a tree or stalk of a shrub or plant and is retained there until the trunk or stalk has become of such size and circumference that it breaks or tears the collar. Without injury to tree or shrub, this collar is preferably self spreading so as to permit the growth of the shrub or tree and the enlargement of the trunk of the shrub or tree. It is preferable to have the collar remain close to the ground, thereby helping to retain the moisture in the ground adjacent to the tree or shrub and preventing, by mulching, the growth of grass, weeds or other vegetation under the collar adjacent to the tree or shrub.

My method for improving the growth of trees or shrubs and similar vegetation consists in placing a relatively flattened cone-shaped collar, preferably having an incline of not over one inch in one foot, made preferably of a moistproof, flexible, but somewhat rigid, sheet material such as felt saturated with a waterprooffing compound like asphalt or coal tar of a melting point sufficiently high to resist the temperature of the sun to which it will be exposed around the stalk or trunk of the shrub or tree. This cone-shaped collar, after being placed about the trunk or stalk, is at its extreme edge preferably retained in contact with the ground at some distance from the trunk of the tree or stalk of the shrub so as to create a mulched area about the stalk or trunk, thereby preventing vegetation in that area and permitting the tree or shrub to obtain all the benefits that flow from said area including the moisture therein. In some instances it may be desirable to invert the collar so as to provide means for conducting water toward the tree in which event the collar would be pressed relatively flat to prevent growth under it.

In the drawing which is a part hereof;

Fig. 1 is an illustration of a collar surrounding a small tree or shrub;

Fig. 2 is a top view of the blank forming the collar;

Fig. 3 shows a top view of the collar as in use without showing the tree or shrub.

In the drawing A is a collar which may be in the form shown or may be rectangular or octagonal etc., and is preferably made of water or moisture-proof, flexible, but relatively rigid, opaque sheets such as a sheet of felt saturated with a suitable waterproofing material such as asphalt, coal tar or other similar material. This sheet may also be, if desired, coated with a bituminous coating and may have embedded in it granular mineral material of any suitable color, as for instance, green to harmonize with the surrounding lawn, or it may be brown or of some other color to harmonize with the trunk of the tree or the earth in which the tree or shrub is growing. Other means may also be provided for coloring the surface, such as painting or otherwise providing a suitable colored surface. This collar blank A is provided with an opening portion B, the size of which is provided for by the slits K which permit the opening B to adjust itself depending on the size of the tree trunk on which it is placed, arranged so as to surround the trunk or stalk of the tree or shrub. A slot or passage or slit C connects this opening B with the outer edge of the collar so that the collar may be readily passed around the trunk of the tree or stalk of the shrub by slightly bending the adjacent edges D and E of the slot C away from each other and passing the collar around the tree or shrub until the tree or shrub is in the opening B. The collar is then laid on and close to the ground with a very slight incline from the center to the periphery. If desired, on the underside may be cemented adjacent to one of the edges D or E a piece of waterproof paper N, shown in dotted lines in Fig. 2, to extend under the slit C.

As will be seen in Fig. 1, the collar A surrounding the trunk of the tree is preferably in contact with the ground, thereby providing a covered area under the collar in which vegetation will not grow.

I claim,

A mulching collar composed of opaque weather resisting flexible material, said collar provided with an opening adapted to surround the trunk of a tree, a passage leading from said opening to the edge of said collar and a weather proof flexible strip adapted to span said passage to close same.

SHIRLEY T. COLMAN.